US012605879B2

(12) United States Patent
Bourvellec et al.

(10) Patent No.: US 12,605,879 B2
(45) Date of Patent: Apr. 21, 2026

(54) METHOD FOR AUTOMATICALLY POSITIONING RAMPS IN A PREFORM HEATING STATION

(71) Applicant: SIDEL PARTICIPATIONS, Octeville-sur-Mer (FR)

(72) Inventors: Loïc Bourvellec, Octeville-sur-Mer (FR); Hervé Pasquier, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 270 days.

(21) Appl. No.: 18/257,207

(22) PCT Filed: Dec. 21, 2021

(86) PCT No.: PCT/EP2021/087005
§ 371 (c)(1),
(2) Date: Jun. 13, 2023

(87) PCT Pub. No.: WO2022/136380
PCT Pub. Date: Jun. 30, 2022

(65) Prior Publication Data
US 2024/0009915 A1 Jan. 11, 2024

(30) Foreign Application Priority Data
Dec. 22, 2020 (FR) ...................................... 2013880

(51) Int. Cl.
*B29C 49/64* (2006.01)
*B29C 49/42* (2006.01)
(Continued)

(52) U.S. Cl.
CPC .... *B29C 49/6418* (2013.01); *B29C 49/42081* (2022.05); *B29C 49/42362* (2022.05);
(Continued)

(58) Field of Classification Search
CPC ................ B29C 49/6418; B29C 49/68; B29C 49/42081; B29C 49/42362
See application file for complete search history.

(56) References Cited

U.S. PATENT DOCUMENTS

2008/0102148 A1* 5/2008 Evrard ................ B29C 49/6835
425/174.4
2011/0300497 A1 12/2011 Derrien
(Continued)

FOREIGN PATENT DOCUMENTS

CN 107810408 A 3/2018
CN 111989207 A 11/2020
(Continued)

*Primary Examiner* — Ko-Wei Lin
(74) *Attorney, Agent, or Firm* — Blake T. Hudson; Stephanie Davy-Jow

(57) ABSTRACT

Provided are methods for automatically positioning ramps in a station for the heating of preforms. The method includes acquiring an image of a preform traveling along a slot delimited by a pair of ramps, where at least one of the ramps is transversely mobile to vary the width of the slot (56) and where a motorized device transversely moves the at least one mobile ramp and is controlled automatically by an electronic control unit. The method further includes automatically determining the diameter below the neck of the preform by computer processing the image and automatically adjusting the width of the slot by moving the at least one mobile ramp according to the determined diameter below the neck.

15 Claims, 5 Drawing Sheets

(51) Int. Cl.

| | |
|---|---|
| *B29C 49/68* | (2006.01) |
| *G06T 7/62* | (2017.01) |
| *B29C 49/78* | (2006.01) |
| *B29D 22/00* | (2006.01) |
| *B29K 67/00* | (2006.01) |
| *B29L 31/00* | (2006.01) |

(52) U.S. Cl.
CPC ............... *B29C 49/68* (2013.01); *G06T 7/62* (2017.01); *B29C 2049/7875* (2022.05); *B29C 2949/22* (2022.05); *B29D 22/003* (2013.01); *B29K 2067/003* (2013.01); *B29L 2031/712* (2013.01)

(56) References Cited

U.S. PATENT DOCUMENTS

| | | | |
|---|---|---|---|
| 2016/0271858 A1* | 9/2016 | Diesnis | ................... B29C 49/46 |
| 2016/0346988 A1 | 12/2016 | Remy | |
| 2020/0238591 A1 | 7/2020 | Höllriegl et al. | |
| 2021/0046677 A1* | 2/2021 | Feigl | ........................ H05B 6/76 |

FOREIGN PATENT DOCUMENTS

| | | | |
|---|---|---|---|
| FR | 3080056 A1 | 10/2019 | |
| JP | 2016138877 A | 8/2016 | |
| WO | WO2017008944 A1 | 1/2017 | |
| WO | WO2019202233 A1 | 10/2019 | |

* cited by examiner

METHOD FOR AUTOMATICALLY POSITIONING RAMPS IN A PREFORM HEATING STATION

CROSS-REFERENCE TO RELATED APPLICATIONS

This application is the 35 U.S.C. § 371 national stage of PCT application having serial number PCT/EP2021/087005, filed on Dec. 21, 2021. This application also claims priority to French application having serial number FR2013880 filed on Dec. 22, 2020, each of which are entirely incorporated herein by reference.

TECHNICAL FIELD OF THE INVENTION

The invention relates to a method for automatically positioning ramps in a preform heating station of a facility for manufacturing containers from preforms made from a thermoplastic material, during a change in preform format.

TECHNICAL BACKGROUND

Facilities for mass manufacturing containers from preforms are known in the art. The preforms are generally obtained by injection-molding a thermoplastic material. They are then cooled and stored with a view to their subsequent processing into final containers.

The preforms conventionally comprise a body that is intended to be shaped into a final container during a forming operation, for example by blow-molding or stretch blow-molding, of the wall of the preform. The preforms also comprise a neck that is already molded into its final shape. It is therefore important to protect the neck of the preform so that it is not deformed or damaged during the manufacturing of the final container.

In order to allow the forming of the body of the preform during the forming step, the wall of the body is heated in advance to a sufficient temperature to render it malleable. This heating operation is carried out just before the forming operation by passing the preform through a heating station.

The heating station generally comprises a heating tunnel in which heating devices such as infrared lamps are arranged. The preforms are received by transport members that convey the bodies thereof in the heating tunnel. In order to allow uniform heating of the body of the preforms, the transport members are generally designed to rotate the preform about its main axis during transport. In order to avoid any overheating of the body of the preform, it is also known practice to provide the heating tunnel with ventilation means that make it possible to circulate the air, thus avoiding the creation of excessively hot zones in the heating tunnel.

The body of the preform is rendered malleable by heating the thermoplastic material forming the wall thereof, in particular beyond a glass transition temperature.

As explained above, the neck of the preform already has its final shape. Unlike the body of the preform, the neck is therefore kept at a temperature below said glass transition temperature in order to avoid the deformation thereof.

To this end, the heating station is designed so that the body of the preform is received in a "hot" part of the station formed by the heating tunnel, while the neck of the preform, which must remain relatively cold, is received in a "cold" part that is generally situated under the heating tunnel.

Of course, the hot part and the cold part of the heating station are adjacent. In order to reduce the thermal exchanges between the hot part and the cold part, it is known practice to interpose between these two parts thermally protective ramps between which the preforms travel. These protective ramps make it possible to reduce the opening of the heating tunnel and the cold part. The protective ramps are spaced apart in order to form a travel slot the width of which is slightly greater than the outer diameter of the section of preform situated directly under the neck in order to allow the preforms to travel without contact with the protective ramps.

These two protective ramps are generally cooled by the internal circulation of a heat transfer liquid in order to prevent heat from building up in the protective ramps.

In addition, some manufacturing facilities also comprise guide ramps that make it possible to guide the preforms instead of simply cooling them. This is for example the case in heating stations that use laser heating means to heat the body of the preforms.

Furthermore, container manufacturing facilities are designed to make it possible to produce final containers with different formats. This generally results in the use of preforms with different formats depending on the batch of containers to be produced.

During a change in container format, it is therefore necessary to adapt the facility, and in particular the heating station, to the dimensions of the new preforms. This in particular involves adjusting the spacing of the ramps in order to adapt the width of the slot to the under-neck diameter of the preforms in the new format. Sometimes, the height of the ramps must also be adjusted as a function of the neck height of the preforms.

The purely manual adjustment of the position of each protective ramp requires time.

The semi-automatic adjustment of the protective ramps by entering the theoretical under-neck diameter of the batch of preforms to be processed into an electronic control unit has been proposed in the prior art. The electronic control unit then controls motorized means for moving the protective ramps in order to obtain a slot width suitable for said theoretical under-neck diameter. However, such a method is not robust, as in the event of a design fault or incorrect labeling of the batch of preforms, the spacing of the ramps can be either too wide, promoting the passage of heat from the tunnel to the cold part and/or preventing optimum guidance of the preforms, or too narrow, causing the preforms to jam when they enter the space between the protective ramps.

In any event, this method does not allow for optimum spacing of the protective ramps relative to the actual value of the under-neck diameter of the preforms.

SUMMARY OF THE INVENTION

The invention proposes a method for automatically positioning ramps in a station for heating preforms of a facility for manufacturing containers from preforms made from a thermoplastic material, each preform having a neck and, directly below the neck, and under-neck section with an outer diameter referred to as the "under-neck diameter", the heating station comprising:

- at least one pair of longitudinal ramps that define a slot for the preforms to travel through, at least one of the ramps being transversely movable in order to vary the width of the slot;
- at least one motorized device for transversely moving the at least one movable ramp in order to adapt the width of the slot, said motorized device being automatically controlled by an electronic control unit;

the positioning method during a change of format of preforms being characterized in that it comprises:

a step of acquiring an image of at least part of the preform taken by means of an image capturing device;

a step of automatically determining the under-neck diameter of the preform by computer processing of said image;

a step of automatically adjusting the width of the slot by moving the at least one movable ramp as a function of the under-neck diameter determined during the step of determining the under-neck diameter in order to adapt the width of the slot to a passage width equal to the under-neck diameter plus a predetermined transverse clearance.

According to other features of the method of the invention:

during the acquisition step, the image capturing device takes the profile at least of the under-neck section of the preform;

the image capturing device is arranged at a predetermined distance from the preform during the image acquisition operation;

during the step of determining the under-neck diameter, the under-neck diameter is obtained by multiplying the width of the under-neck section measured on the image by a predetermined proportionality coefficient;

during the step of determining the under-neck diameter, the outline of the part of the preform shown in the image is compared with preform outlines stored by the electronic control unit, each stored outline being associated with an under-neck diameter stored by the electronic control unit;

the preforms have a main axis orthogonal to their direction of travel, the neck of the preforms having a collar arranged at the join with the under-neck section, the ramps of the pair being height-adjustable, parallel to the main axis of the preforms, by means of a motorized device for vertical movement of the ramps, and, during the acquisition step, the image capturing device taking the profile at least of the neck and of the under-neck section of the preform, the method comprising a step of automatically determining a neck height by computer processing of said image, this step of determining the neck height being followed by a step of automatically adjusting the height of the ramps as a function of the neck height determined;

during the step of determining the neck height, the neck height is obtained by multiplying the neck height measured on the image by a predetermined proportionality coefficient;

during the step of determining the neck height, the outline of the image is compared with preform outlines stored by the electronic control unit, each stored outline being associated with a neck height stored by the electronic control unit;

the acquisition step is carried out on a preform that is traveling along a production route in the manufacturing facility;

the acquisition step is carried out on a preform that is traveling in the heating station in a predetermined zone along a heating path;

the method comprises a prior step of initially automatically positioning the ramps until the slot has a maximum width;

during the prior step of initially automatically positioning the ramps, the ramps are moved vertically to a maximum height at which the ramps are spaced apart from the neck of the preform by a maximum vertical distance;

at least one pair of ramps is formed by ramps for thermally protecting the neck of the preforms;

at least one pair of ramps is formed by ramps for guiding the preform.

BRIEF DESCRIPTION OF THE FIGURES

Further features and advantages of the invention will become apparent on reading the following detailed description, which will be more clearly understood with reference to the appended drawings, in which.

DETAILED DESCRIPTION OF THE INVENTION

In the description hereinafter, elements with an identical structure or similar functions will be denoted by the same reference sign.

In the description hereinafter, orientations referred to as longitudinal, from back to front, transverse, from left to right, and vertical, from bottom to top, will be used in a non-limiting manner and indicated by the trihedron "L, V, T" in the figures. The vertical direction is used as a purely geometric reference unrelated to the earth's gravity.

Figure 1:
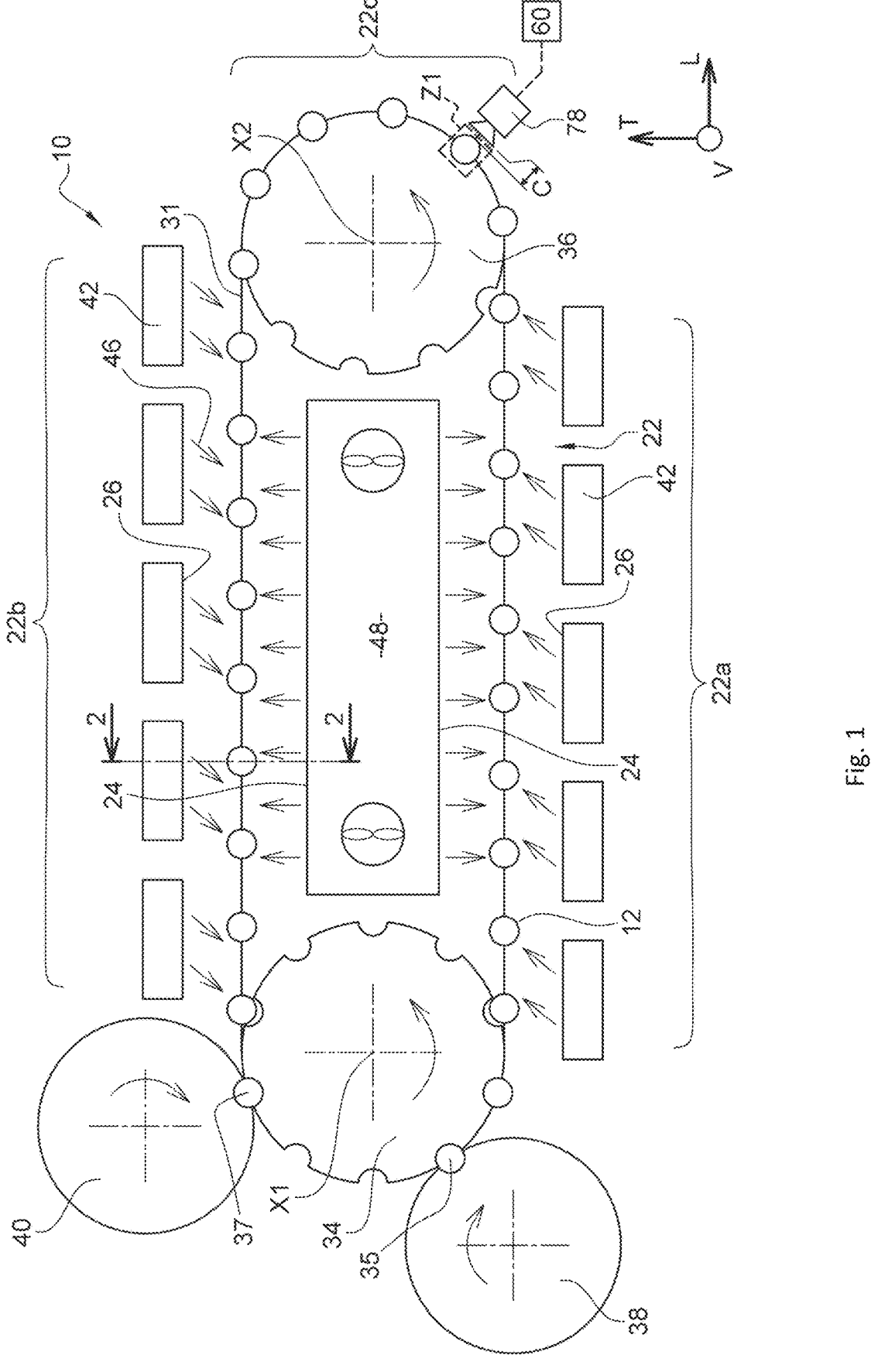
FIG. 1 is a top view schematically showing a heating station suitable for implementing the method produced according to the teachings of the invention.

FIG. 1 shows a heating station 10 belonging to a facility for manufacturing containers by forming preforms 12 made from a thermoplastic material, such as polyethylene terephthalate (PET), by blow-molding or stretch blow-molding. The preforms 12 travel one after the other along a production route that passes through various processing stations, including the heating station, of the manufacturing facility.

As shown in FIGS. 2 to 6, a preform 12 takes the form of an axisymmetrical hollow body with a main axis "A", which is shown vertically here. The preform 12 is closed at a first axial end by a base 14, shown here at the top in FIGS. 2 to 4 and at the bottom in FIGS. 5 and 6, and it is open at an opposite axial end forming a neck 16, shown here at the bottom in FIGS. 2 to 4 and at the top in FIGS. 5 and 6. The preform 12 is thus axially divided into a first section that extends from the base 14 to the start of the neck 16, this first section commonly being referred to as the body 18 of the preform, and a second section formed by said neck 16. Where it joins the body 18 of the preform 12, the neck 16 comprises a collar 20.

The section of body 18 arranged directly in contact with the collar 20, and shown here just above the neck 16 with reference to FIGS. 2 to 4, will hereinafter be referred to as the under-neck section 21. The outer diameter of the under-neck section 21 will hereinafter be denoted as the "under-neck diameter D1" (as the preform 12 is shown here upturned in FIGS. 2 to 4). Likewise, the height of the neck 16 taken along the main axis "A" of the preform 12 will hereinafter be referred to as the "neck height H1". In a known manner, the body 18 of the preform 12 is intended to be stretched during an operation for forming the final container, while the neck 16 of the preform 12 already has the shape required for the final container. To this end, the body 18 is intended to be heated in the heating station 10 so that it becomes malleable, while the neck 16 is intended to remain temperate in the heating station 10 to prevent it from being deformed.

With reference to FIG. 1, the heating station 10 comprises a heating tunnel 22 that here has two longitudinal sections 22a, 22b connected to each other by an end bend 22c. Each longitudinal section 22a, 22b of the heating tunnel 22 is transversely delimited by an inner wall 24 and an outer wall 26.

The heating station 10 further comprises members 28 for individually transporting the preforms 12 in a line along the heating tunnel 22 along a heating path that forms a section of the production route. Here, the preforms 12 are transported with their axis "A" extending vertically and the neck 16 facing downward on the longitudinal sections 22a, 22b and on the end bend 22c in order to protect the neck 16 from the heat. The main axis "A" of the preforms 12 is thus orthogonal to their direction of travel along the heating path.

Figure 5:
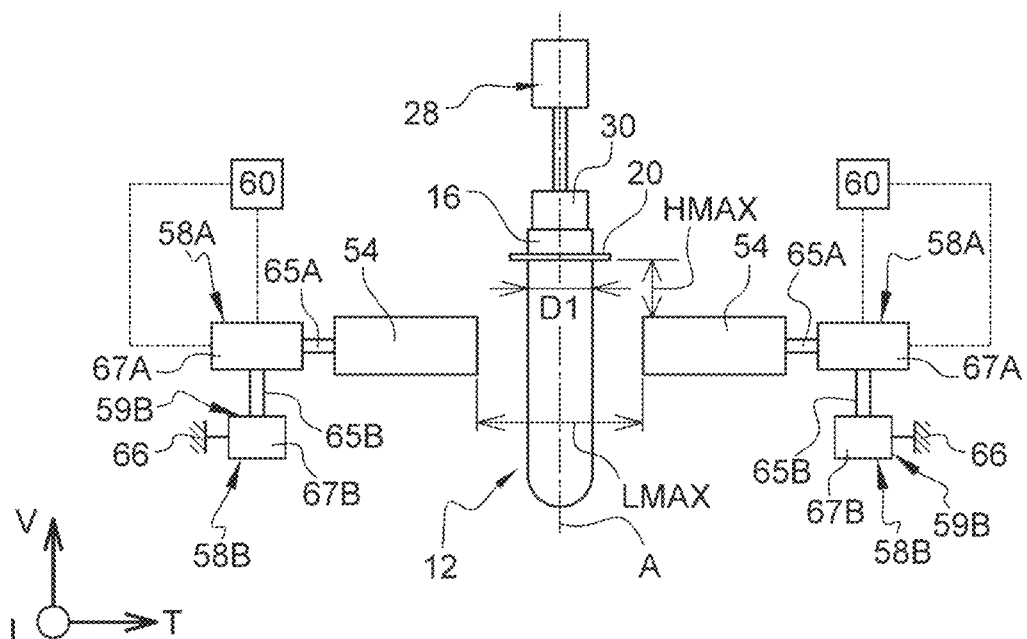
FIG. 5 is a similar view to FIG. 3 in which the heating station is produced according to a second embodiment, the ramps occupying an initial position corresponding to the start of the method according to the invention.
Figure 6:
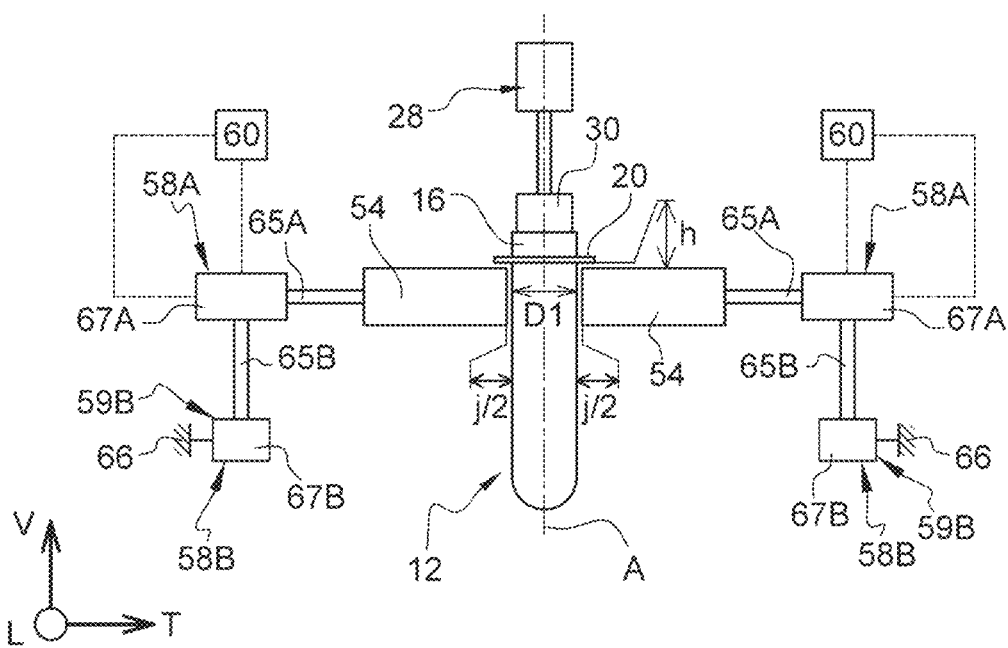
FIG. 6 is a similar view to FIG. 5 in which the ramps occupy an optimum final position relative to the preform.
Figure 7:
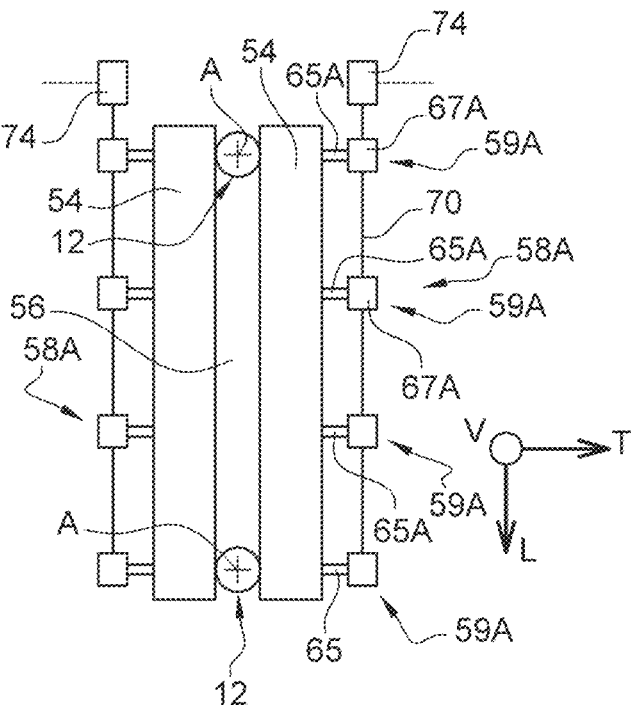
FIG. 7 is a top view of a longitudinal section of the tunnel of the heating station produced according to any one of the embodiments, showing the ramps and their motorization device.

As a variant shown in FIGS. 5 and 6, the invention is also applicable to preforms that are transported with the neck upward.

As shown in FIGS. 2 to 6, a transport member 28 generally comprises a mandrel 30, also known as a spinner, which is suitable for being inserted into the neck 16 of the preform 12 to be transported.

Here, the preforms 12 are conveyed by a closed chain 31 of transport members 28. To this end, each transport member 28 here comprises a link 32 that acts as a support for the mandrel 30. Each link 32 is articulated with the links 32 of the adjacent transport members 28.

The mandrel 30 is generally rotatably mounted about a vertical axis on the link 32 in order to allow the preforms 12 being transported to be rotated about their main axis "A" as they travel along the tunnel 22.

The chain 31 is guided and set in motion by meshing around two guide wheels 34, 36. Each guide wheel 34, 36 is rotatably mounted about an associated central vertical axis "X1, X2". The guide wheels 34, 36 are arranged at the two longitudinal ends of the longitudinal sections 22a, 22b of the heating tunnel 22.

At least one of the guide wheels 34, 36 is rotated in order to move the mandrels 30. For example, one of the two guide wheels 34, 36 is driven by a motor while the other of the two guide wheels 34, 36, referred to as the driven wheel, is rotated by the chain 31.

As a variant, each of the two guide wheels is rotated by a motor, for example by means of a brushless motor. The two guide wheels are jointly rotated. This advantageously makes it possible to reduce the tension in the chain 31. As a variant, not shown, the invention is also applicable to transport members that are held by independent shuttles that travel along a rail. Each shuttle forms a linear electric motor with the rail, for example.

The first guide wheel 34 is configured to make it possible to load cold preforms 12 at a loading point 35 situated upstream of the first longitudinal section 22a in the direction of travel of the preforms 12. The cold preforms 12 are delivered by an input wheel 38. The first guide wheel 34 is also configured to make it possible to unload the hot preforms 12 at an unloading point 37 situated downstream of the second longitudinal section 22b and upstream of the loading point 35. The hot preforms 12 are received by an output wheel 40.

The second guide wheel 36 makes it possible to make the end bend 22c of the heating tunnel 22 between the two longitudinal sections 22a, 22b.

At least one of the two guide wheels 34, 36 is rotated by a motor (not shown) in order to rotate the chain in an anti-clockwise direction with reference to FIG. 1. The preforms 12 thus travel, upturned with the neck 16 downward in FIGS. 2 to 4 or neck upward in FIGS. 5 and 6, longitudinally in succession toward the front along the heating path through the first tunnel section 22a, then on the end bend 22c and finally longitudinally toward the back through the second tunnel section 22b.

Figure 2:
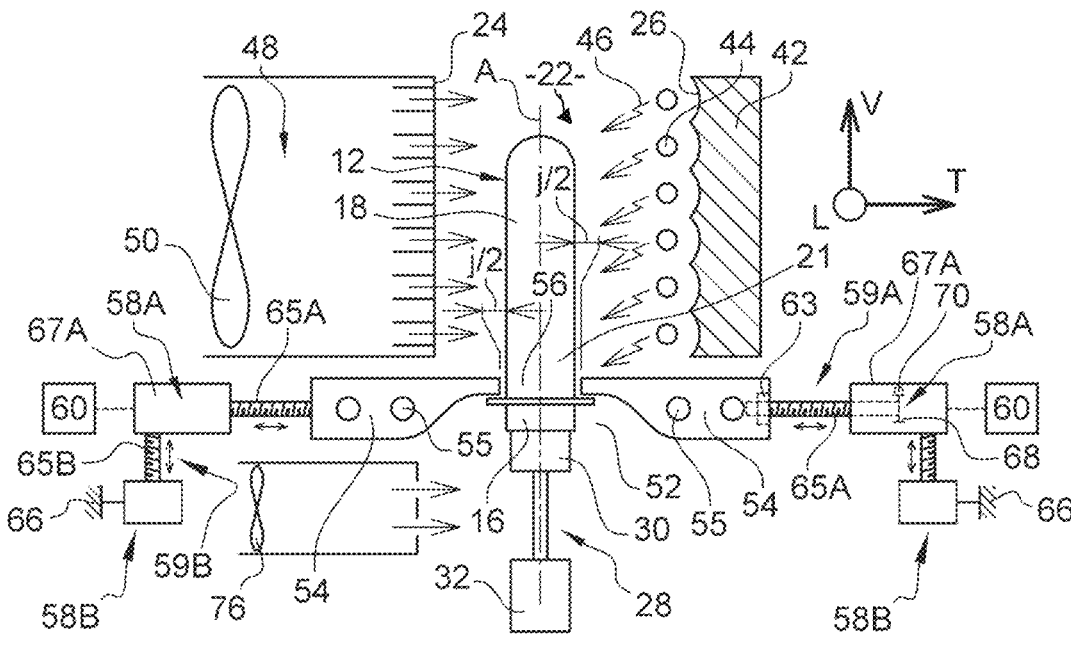
FIG. 2 is a transverse cross-sectional view along the line 2-2 in FIG. 1, showing a preform traveling in a heating tunnel of the heating station between two ramps positioned optimally relative to the preform, the heating station being produced according to a first embodiment.
Figure 3:
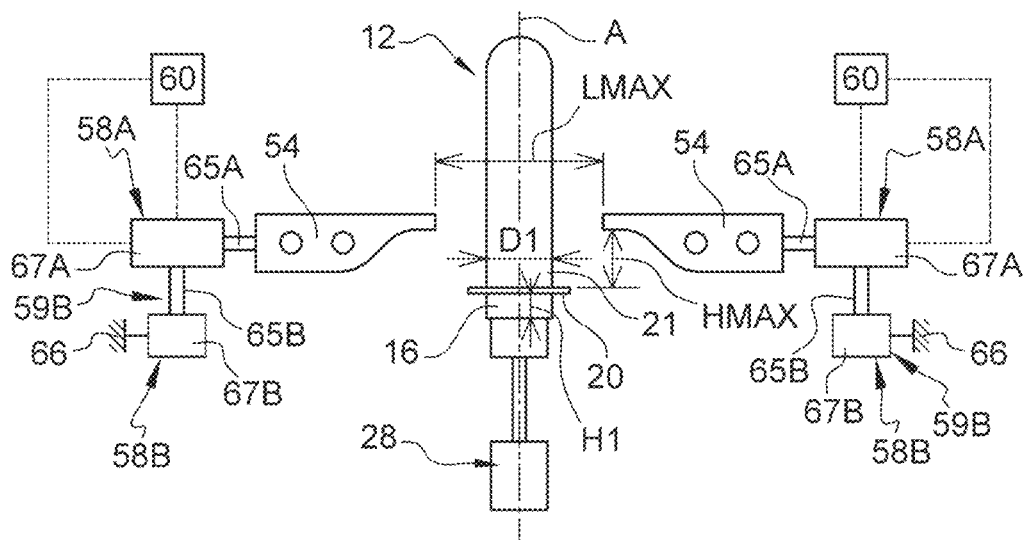
FIG. 3 is a similar view to FIG. 2 in which only the ramps and devices for moving the ramps are shown, the ramps occupying an initial position corresponding to the start of the method according to the invention.
Figure 4:
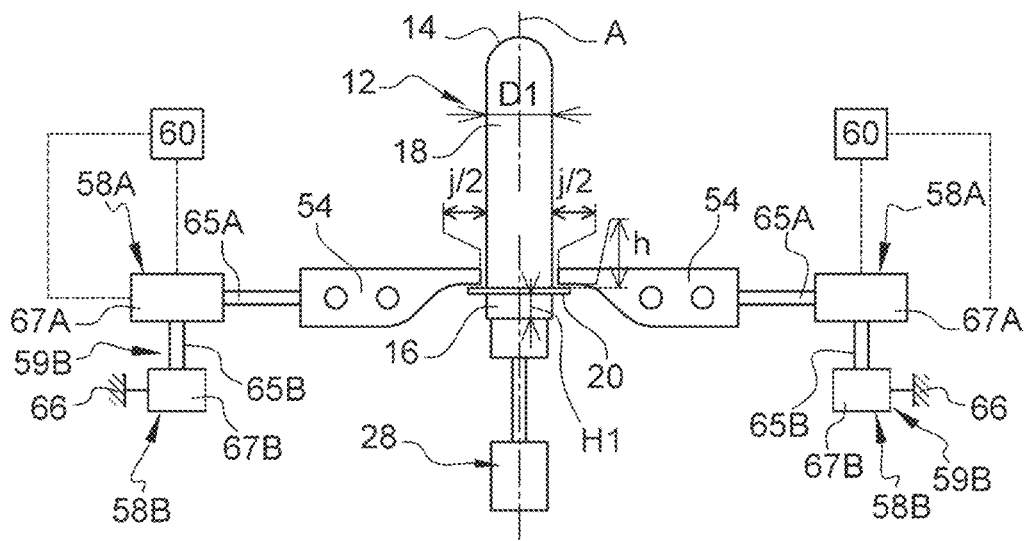
FIG. 4 is a similar view to FIG. 3 in which the ramps occupy an optimum final position relative to the preform.

According to a first embodiment of the heating station 10 shown in FIGS. 2 to 4, here, the outer wall 26 of the heating tunnel 22 is formed by the inner face of a plurality of heating modules 42. Each heating module 42 comprises radiant heating means that radiate heat radiation 46 generally transversely toward the inside of the heating tunnel 22, as illustrated in FIG. 2. In a non-limiting manner, here, these are laser lamps 44 or diodes emitting in the infrared spectrum.

Here, the inner wall 24 of the heating tunnel 22 is formed by a face of a cooling unit 48. Here, the cooling unit 48 is arranged transversely between the two longitudinal tunnel sections 22a, 22b. As shown schematically in FIG. 2, the cooling unit 48 comprises ventilation means such as a fan 50 blowing a forced air stream that is directed transversely toward the inside of the tunnel 22 through a grille formed in the inner wall 24.

The tunnel 22 is intended to receive the bodies 18 of the upturned preforms 12 with the neck 16 downward, their axis "A" extending vertically, in order to allow them to be heated to the temperature for the subsequent operation for forming the final containers.

As a variant, not shown, the preforms travel upright, neck upward.

The tunnel 22 emerges vertically downward into a corridor 52 in which the necks 16 of the preforms 12 travel. As explained above, the necks 16 of the preforms 12 must be temperate, that is, kept at a temperature below the glass transition temperature of the material from which they are made.

When the heating modules 42 comprise radiant heating means, the radiation is emitted in all directions, including toward the neck 16 of the preforms 12. In order to limit the passage of heat radiation from the tunnel 22 toward the corridor 52, or the passage of hot air by convection, at least one pair of ramps 54 for thermally protecting the necks 16 of the preforms 12 is interposed vertically between the tunnel 22 receiving the bodies of the preforms and the corridor 52 receiving the necks 16 of the preforms. The protective ramps 54 thus vertically define the tunnel 22. The protective ramps 54 extend parallel to each other in a longitudinal direction. Here, each longitudinal section 22a, 22b is provided with a pair of protective ramps 54. The upper face of each protective ramp 54, facing toward the tunnel 22, advantageously forms a reflective surface that makes it possible to reflect the heat radiation toward the body 18 of the preform 12.

In order to prevent heat from building up in the protective ramps 54, each protective ramp 54 is advantageously provided with cooling means 55 such as a cooling circuit in which a heat transfer fluid circulates.

In addition, in order to prevent the heat passing through a slot 56 from heating the air contained in the corridor 52, second ventilation means 76 can be arranged to blow a forced air stream transversely into the corridor 52 in order to expel the hot air from it, as shown in FIG. 2.

According to a second embodiment of the heating station 10 shown in FIGS. 5 and 6, the heating means are formed by members emitting heating laser radiation. The body of the preforms is then heated locally substantially without the heat radiating in all directions. In this case, the ventilation means do not need to be as powerful as in the heating configuration using radiant heating means. Furthermore, here, the preforms 12 circulate with the neck 16 upward, as the tunnel 22 is not exposed to significant radiation and the neck 16 is therefore less likely to be heated by convection, as in the first embodiment.

As a variant, it is of course possible to circulate the preforms neck downward as in the first embodiment.

In this second embodiment, the heating station is also provided with at least one pair of ramps, but here, these are ramps for guiding the preforms. The ramps do not therefore act as a thermal shield as is the case for the thermally protective ramps. Such guide ramps 54 are thus similar to those shown in FIGS. 3 and 4, but they do not have the cooling means 55.

Hereinafter, the term "ramps 54" will be used without distinction to denote the protective ramps and the guide ramps. The invention is applicable independently to the first embodiment and to the second embodiment of the heating station 10.

The ramps 54 are generally arranged on the longitudinal sections 22a, 22b of the tunnel 22. The heating station 10 thus generally comprises two pairs of ramps 54, each arranged in an associated longitudinal section 22a, 22b of the tunnel 22, while the bend 22c is not provided with ramps.

The ramps 54 in a pair are arranged in the same transverse and longitudinal plane, on either side of the heating path of the preforms 12. To this end, the ramps 54 are transversely spaced apart to leave a longitudinal slot 56 for the preforms 12 to travel through.

The ramps 54 in a pair are arranged level with the under-neck section 21, that is, above the collar 20 of the preforms 12 when they are traveling with the neck 16 downward or below the collar 20 when they are traveling with the neck 16 upward.

During production operation of the heating station, the slot 56 has a transverse width equal to the sum of the under-neck diameter "D1" of the preform 12 and a transverse clearance "j", as shown in FIGS. 2, 4, and 6. The transverse clearance "j" is divided into two substantially equal parts "j/2" on either side of the preform 12 to allow it to travel between the ramps 54 without contact with them. The clearance "j" is thus equal to the sum of the parts "j/2+j/2". Here, the width of the slot 56 is less than the outer diameter of the collar 20 of the preforms 12.

In order to make it possible to adapt the width of the slot 56 to a plurality of formats of preforms 12, at least one ramp 54 in a pair is transversely movably mounted relative to the heating tunnel 22. This makes it possible to vary the width of the slot 56 between a maximum width "Lmax", shown in FIGS. 3 and 5, and a minimum width "Lmin" (not shown). In the example shown in FIGS. 2 to 6, the two ramps 54 in the pair are transversely movably mounted relative to the heating tunnel 22.

Furthermore, the transverse movement of the ramps 54 is controlled by a motorized transverse movement device 58A in order to automatically adapt the width of the slot 56. The motorized transverse movement device 58A is capable of being automatically controlled by an electronic control unit 60.

As a variant of the invention, not shown, the heating module is also transversely movably mounted relative to the trajectory of the preforms. The heating module is for example rigidly connected to the ramp or is independently movable by means of a mechanism similar to the mechanism for moving the ramps.

Here, the motorized transverse movement device 58A of a ramp 54 comprises a plurality of transverse movement mechanisms 59A that are mounted along the ramp 54. Here, each transverse movement mechanism 59A is formed by a mechanical jack. Such a transverse movement mechanism 59A comprises a nut 63 that is fixedly mounted on the protective ramp 54 and a rod 65A that is threaded here, as illustrated in FIG. 2. The rod 65A can be transversely rotatably guided in a fixed housing 67A relative to a frame 66 of the heating station 10. The frame 66 is more particularly fixed relative to the ground on which it is resting.

The rod 65A is connected to means that rotate it. Here, these rotating means comprise a toothed wheel 68 that is rigidly connected to the rod 65A for rotation therewith. The toothed wheel 68 is associated with a threaded shaft 70. This threaded shaft 70 extends longitudinally all along the associated ramp 54, meshing with the toothed wheel 68 of each transverse movement mechanism 59A associated with said ramp 54. Here, the toothed wheel 68 is accommodated in the fixed housing 67A.

The rotation of the threaded shaft 70 is controlled by an electric motor 74 arranged at the end of the shaft, as illustrated in FIG. 5. Depending on the direction of rotation of the electric motor 74, it will cause the transverse translational movement of the protective ramp 54 in one direction or the other, to space apart the protective ramps 54 or bring them together.

The motors 74 of the motorized transverse movement devices 58A are automatically controlled by the electronic control unit 60.

The motors 74 controlling the transverse movement of the ramps 54 in the same pair are capable of being controlled simultaneously in order to simultaneously bring together or space apart the two protective ramps 54 relative to each other by the same distance. The ramps 54 are thus always symmetrical relative to the same fixed mid-plane relative to the frame 66, regardless of the width of the slot 56. When they travel between the ramps 54 in the pair, the main axis "A" of the preforms 12 is substantially contained in this mid-plane.

Of course, the motorized transverse movement device is described as a non-limiting example here. The invention is applicable to movement devices with different designs, such as pneumatic jacks, hydraulic jacks, linear electric motors, etc.

Furthermore, here, the ramps 54 in the same pair are height-adjustable, parallel to the main axis "A" of the preforms 12, in order to make it possible to adapt the position of the ramps 54 to different heights of the neck 16 as a function of the formats of preforms 12 that can be received by the heating station 10. This configuration is in particular useful when the formats of preform 12 handled have necks 16 the neck heights "H1" of which vary greatly, for example with a difference of the order of 5 mm.

This makes it possible to vary the height of the ramps 54 between a maximum height "Hmax" at which the ramps 54 are spaced apart from the neck 16 of the preforms by a maximum vertical distance toward the base 14 of the preforms 12, as shown in FIGS. 3 and 5, and a minimum height "Hmin" (not shown) at which the ramps 54 are returned toward the inside of the tunnel 22.

During production operation of the heating station 10, the ramps 54 must be arranged at a predetermined distance "h" from the collars 20 toward the base 14, here above the collars 20, that allows the preforms 12 to travel along their heating path without contact with the ramps 54. However, the distance "h" must be small enough so that the body 18 of the preforms 12 is correctly exposed to the heat radiation or heating laser radiation.

The vertical movements of the ramps 54 are controlled by means of a motorized device 58B for the vertical movement of the ramps 54. Like the transverse movement device 58A, the motorized vertical movement device 58B comprises vertical movement mechanisms 59B that are arranged along the ramp 54 and are simultaneously controlled to move the ramp 54 in vertical translation. Such a vertical movement mechanism 59B comprises a rod 65B that extends vertically and is vertically slidably mounted in a fixed housing 67B relative to the frame 66.

Here, each vertical movement mechanism 59B is arranged below an associated transverse movement mechanism 59A. The housing 67A of each transverse movement mechanism is rigidly connected to the rod 65B of the associated vertical movement mechanism 59B for vertical movement therewith. The motorized vertical movement device 58B thus makes it possible to adjust the height of the ramp 54 by moving the transverse movement device 58A. Of course, the motor 74 and the threaded shaft 70 are also moved vertically. The vertical movement mechanisms 59B are for example formed by mechanical jacks, hydraulic jacks, pneumatic jacks or linear electric motors.

As a variant, the ramps are not height-adjustable. In this case, the body of each transverse movement mechanism is fixedly mounted relative to the frame of the heating station.

During a change of format of preforms 12, the ramps 54 must be precisely positioned so as to ensure that the slot 56 is sufficiently wide to allow the preforms 12 to travel satisfactorily. In this case, the heating station 10 is capable of operating in an adjustment operating mode in which some functions, such as the heating, are not yet fully active, as opposed to production operation during which all of the functions, including the heating function, are active.

The slot 56 must however be narrow enough to minimize the transmission of heat, by radiation or convection, between the tunnel 22 and the corridor 52, if the ramps 54 are thermally protective ramps, or to allow effective guiding of the preforms, if the ramps 54 are guide ramps.

When the ramps 54 are height-adjustable, the height must be adjusted so that the ramps 54 are sufficiently close to the neck 16 so as to allow optimum guiding of the preform 12 and/or to effectively protect the neck 16 from the thermal radiation without compromising the heating of the body 18. However, the ramps 54 must not be in contact with the collars 20 in order to avoid damaging the preforms 12 by friction.

The invention proposes a method for automatically positioning the ramps 54 in a pair during a change of format of preforms 12.

To this end, the manufacturing facility is provided with an image capturing device 78, as shown in FIG. 1. The image capturing device 78 is for example a camera or photographic device with a digital sensor capable of taking a digital image. The image capturing device 78 is arranged so that it can take an image of at least part of a preform 12 that is traveling along the production route.

More specifically, here, the image capturing device 78 is arranged in the heating station 10 so that it takes an image of the preform 12 traveling along the heating path when it is held by an associated transport device, here a mandrel 30. The image capturing device 78 is more particularly arranged so that it takes an image of the preform 12 when it passes through a predetermined acquisition zone "Z1" of the heating path.

More specifically, the image capturing device 78 is arranged so that it takes the profile at least of the under-neck section 21 of the preform 12 in a radial direction relative to the axis "A" of the preform 12. As will be explained hereinafter, this makes it possible to determine the under-neck diameter "D1" of the preform 12 in order to adjust the width of the slot 56.

Furthermore, when the ramps 54 are height-adjustable, as is the case here, the image capturing device 78 is arranged so that it takes the profile at least of the neck 16 and the under-neck section 21 of the preform 12 in a radial direction relative to the axis "A" of the preform 12. As will be explained hereinafter, this makes it possible to determine the height "H1" of the neck 16 of the preform 12 in order to adjust the height of the ramps 54.

Here, the acquisition zone "Z1" is arranged on the end bend 22c. Here, the image capturing device 78 is arranged on the outside of the end bend 22c.

This arrangement is particularly advantageous as this area of the heating station 10 generally has sufficient free space to receive the image capturing device 78. Furthermore, the tunnel 22 is not provided with heating means on the bend 22c, which makes it possible to avoid the image capturing device 78 being damaged by excessively high temperatures.

As a variant, the acquisition zone can be arranged at any other point of the heating path situated in an area allowing the arrangement of an image capturing device.

According to yet another variant, the image capturing device is arranged so that it acquires an image of the preform when it is traveling on part of the production route that does not form part of the heating path, for example upstream of the heating station.

Advantageously, the image capturing device 78 is arranged at a predetermined distance "C" from the preform 12 situated in the acquisition zone "Z1" during the image acquisition operation. This makes it possible to know the scale at which the preform 12 appears in the image without needing to refer to a visual reference. The image capturing device 78 is designed and positioned so that it takes a digital image of the preform 12 with sufficiently high resolution to carry out the operations that make it possible to determine the under-neck diameter "D1" and, optionally, the height "H1" of the neck 16 to within less than one millimeter.

Each of the steps of the positioning method is carried out automatically by the electronic control unit 60.

The method is implemented by loading a preform 12 onto a mandrel 30, then triggering the movement of the transport member 28 as during the production operation of the heating station 10. However, only a limited number of preforms 12, for example just one, is loaded into the heating station 10 during the implementation of the method.

Figure 8:
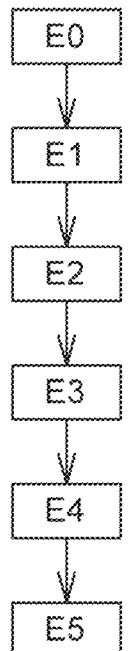
FIG. 8 is a block diagram showing the method for automatically positioning the ramps implemented according to the teachings of the invention.

With reference to FIG. 8, the positioning method comprises a prior step "E0" of initial positioning of the ramps 54.

During this prior initial positioning step "E0", the ramps 54 are spaced apart by means of the transverse movement devices 58A until the slot 56 is at its maximum width "Lmax". This initial positioning step "E0" is in particular required when the subsequent acquisition step is carried out after the preform 12 has been engaged between ramps 54 of the heating station 10.

In the present case, the preform 12 is loaded onto a mandrel 30 at the usual loading point 35, and then it travels along the first longitudinal section 22a between a first pair of ramps 54 before arriving in the acquisition zone "Z1" situated on the end bend 22c. Although the preform 12 is not engaged between ramps 54 when it occupies the acquisition zone "Z1", it has thus had to be engaged between the ramps 54 of the first longitudinal section 22a before reaching the acquisition zone "Z1". The initial positioning step "E0" is therefore required before the preform 12 is transported along the heating path.

Furthermore, this initial positioning step "E0" is also required when the preform 12 is intended to be engaged between ramps 54 quickly after it has passed through the acquisition zone "Z1", in particular when the time necessary for adjusting the position of the ramps 54 does not make it possible to guarantee that the slot 56 will be wide enough to allow the preform 12 to pass through when it arrives at the entrance to the slot 56. Conversely, if the preform 12 is not intended to be engaged between ramps before it occupies the acquisition zone "Z1" or quickly after it has passed through the acquisition zone "Z1", the prior initial positioning step "E0" can be omitted from the positioning method.

When the ramps 54 are height-adjustable, the ramps 54 are controlled to their height "Hmax" by the motorized vertical movement device 58B during this prior initial positioning step "E0".

The positioning method comprises a first step "E1" of acquiring an image of the preform 12. This acquisition step "E1" is triggered when the preform 12 passes through the acquisition zone "Z1" of the heating path.

Advantageously, the preform 12 moves constantly without stopping in the acquisition zone "Z1". The image obtained is communicated to the electronic control unit 60.

When the method comprises the prior initial positioning step "E0", this acquisition step "E1" is generally carried out chronologically after said prior initial positioning step "E0".

At the end of the acquisition step "E1", a second step "E2" of automatically determining the under-neck diameter "D1" is triggered. During this step, of the preform by computer processing of said image by means of the electronic control unit 60.

When the ramps 54 are also automatically height-adjustable, the method also comprises a third step "E3" of automatically determining the height "H1" of the neck 16 by computer processing of said image. This third step "E3" of determining the height "H1" of the neck 16 can be carried out before, after or at the same time as the second step "E2"

of determining the under-neck diameter "D1". In any event, this third step "E3" of determining the height "H1" of the neck 16 is triggered chronologically after the first acquisition step "E1".

During each of the second and third determining steps "E2" and "E3", the required dimensions, the under-neck diameter "D1" and the height "H1" of the neck 16 respectively, are obtained by multiplying said dimension measured on the image by a predetermined proportionality coefficient "K". The proportionality coefficient "K" is in particular calculated as a function of different known parameters such as the distance between the image capturing device 78 and the features of the lens with which it is provided. The proportionality coefficient "K" can also be defined experimentally during a prior calibration operation.

According to one variant embodiment of the third and second determining steps "E2", "E3", the outline of the part of the preform shown in the image, referred to as the "detected outline", is compared with the outlines of preforms previously stored in the electronic control unit 60, referred to as "standard outlines". The number of formats of preforms 12 that can be processed by the heating station 10 is generally limited. It is thus possible to exhaustively store a standard outline for each of these preform formats in the electronic control unit 60.

Each standard outline stored is associated with an under-neck diameter "D1" and/or a height "H1" of the neck 16 stored in a database of the electronic control unit 60.

When the particular shape and dimensions of the detected outline correspond substantially to those of a stored similar standard outline, the electronic control unit 60 is thus capable of automatically identifying the standard outline among the stored standard outlines by shape recognition. The electronic control unit 60 is then able to find the corresponding under-neck diameter "D1" and height "H1" of the neck 16 in the database. The method also comprises a fourth step "E4" of automatically adjusting the width of the slot 56 by moving the at least one movable ramp 54 as a function of the under-neck diameter "D1" determined during the second step "E2" of determining the under-neck diameter "D1" in order to adjust the width of the slot 56 to a passage width equal to the under-neck diameter "D1" plus the transverse clearance "j" determined. Here, the two ramps 54 in the pair are controlled to move simultaneously. To this end, the electronic control unit 60 controls the motorized transverse movement devices 58A. This fourth step "E4" of adjusting the width occurs chronologically after the second step "E2" of determining the under-neck diameter "D1".

The method also comprises a fifth step "E5" of automatically adjusting the height of the ramps 54 as a function of the neck height "H1" determined during the third step "E3" of determining the neck height in order to bring the ramps 54 to the predetermined distance "h" from the collar 20. To this end, the electronic control unit 60 controls the motorized vertical movement devices 58B. This fifth step "E5" of automatically adjusting the height occurs chronologically after the third step "E3" of determining the height "H1" of the neck 16.

The fourth step "E4" of adjusting the width and the fifth step "E5" of automatically adjusting the height can be carried out simultaneously or one after the other in any order.

The method implemented according to the teachings of the invention advantageously makes it possible to carry out the automatic positioning of the ramps 54 during a change of formats of preforms 12 in order to obtain a slot 56 with an optimum width and/or an arrangement at an optimum height. This method makes it possible to eliminate the human errors inherent in manual data entry, incorrect labeling of the batch of preforms, or defective manufacturing of the preforms.

The invention claimed is:

1. A method for automatically positioning ramps (54) in a station (10) for heating preforms (12) of a facility for manufacturing containers from preforms (12) made from a thermoplastic material, each preform (12) having a neck (16) and, directly below the neck (16), an under-neck section (21) with an outer diameter referred to as the "under-neck diameter (D1)", the heating station (10) comprising:

at least one pair of longitudinal ramps (54) that define a slot (56) for the preforms (12) to travel through, at least one of the at least one pair of longitudinal ramps (54) being transversely movable in order to vary a width of the slot (56);

at least one motorized device (58A) for transversely moving the at least one transversely movable ramp of the at least one pair of longitudinal ramps (54) in order to adapt the width of the slot (56), said at least one motorized device (58A) being automatically controlled by an electronic control unit (60);

the method comprising, during a change of format of preforms (12):

an acquisition step (E1) of acquiring an image of at least part of each preform (12) taken by means of an image capturing device (78);

a step (E2) of automatically determining the under-neck diameter (D1) of each preform by computer processing of said image;

a step (E4) of automatically adjusting the width of the slot (56) by moving the at least one transversely movable ramp of the at least one pair of longitudinal ramps (54) as a function of the under-neck diameter (D1) determined during the step (E2) of determining the under-neck diameter in order to adapt the width of the slot (56) to a passage width equal to the under-neck diameter (D1) plus a predetermined transverse clearance (j).

2. The method as claimed in claim 1, wherein during the acquisition step (E1), the image capturing device (78) takes the profile at least of the under-neck section (21) of each preform (12).

3. The method as claimed in claim 2, wherein the image capturing device (78) is arranged at a predetermined distance (C) from the preform (12) during the image acquisition step (E2).

4. The method as claimed in claim 3, wherein during the step (E2) of determining the under-neck diameter (D1), the under-neck diameter (D1) is obtained by multiplying a width of the under-neck section (21) measured on the image by a predetermined proportionality coefficient (K).

5. The method as claimed in claim 4, wherein during the step (E2) of determining the under-neck diameter (D1), an outline of the at least part of each preform (12) shown in the image is compared with preform outlines stored by the electronic control unit (60), each stored outline being associated with an under-neck diameter (D1) stored by the electronic control unit (60).

6. The method as claimed in claim 3, wherein each preform (12) has a main axis (A) orthogonal to a direction of travel, the neck (16) of each preform (12) having a collar (20) connected with the under-neck section (21), the at least one pair of longitudinal ramps (54) are vertically adjustable, parallel to the main axis (A) of each preform, by means of a motorized device (58B), and wherein, during the acquisition step (E1), the image capturing device (78) takes the profile at least of the neck (16) and the under-neck section (21) of each preform (12), the method comprising a step (E3) of automatically determining a neck height (H1) of the neck (16) by computer processing of said image, this step (E3) of determining the neck height being followed by a step (E5) of automatically adjusting the height of the at least one pair of longitudinal ramps (54) as a function of the neck height (H1) determined.

7. The method as claimed in claim 6, wherein during the step (E3) of determining the neck height, the neck height (H1) is obtained by multiplying the neck height measured on the image by a predetermined proportionality coefficient (K).

8. The method as claimed in claim 6, wherein during the step (E3) of determining the neck height, the outline of the image is compared with preform outlines stored by the electronic control unit (60), each stored outline being associated with a neck height (H1) stored by the electronic control unit (60).

9. The method as claimed in claim 1, wherein the acquisition step (E1) is carried out on each preform (12) that is traveling along a production route in the manufacturing facility.

10. The method as claimed in claim 6, wherein the acquisition step (E1) is carried out on each preform (12) that is traveling in the heating station (10) in a predetermined zone along a heating path.

11. The method as claimed in claim 10, further comprising a prior step (E0) of initially automatically positioning the ramps (54) until the slot (56) has a maximum width (Lmax).

12. The method as claimed claim 11, wherein during the prior step (E) of initially automatically positioning the at least one pair of longitudinal ramps (54), the at least one pair of longitudinal ramps (54) are moved vertically to a maximum height (Hmax) at which the ramps (54) are spaced apart from the neck (16) of each preform (12) by a maximum vertical distance.

13. The method as claimed in claim 10, wherein at least one pair of longitudinal ramps (54) is configured for thermally protecting the neck (16) of each preform.

14. The method as claimed in claim 10, wherein at least one pair of longitudinal ramps (54) configured for guiding each preform (12).

15. The method as claimed in claim 3, wherein during the step (E2) of determining the under-neck diameter (D1), the outline of the the at least part of each preform (12) shown in the image is compared with preform outlines stored by the electronic control unit (60), each stored outline being associated with an under-neck diameter (D1) stored by the electronic control unit (60).

* * * * *